United States Patent [19]

Sordahl

[11] Patent Number: 5,667,163
[45] Date of Patent: Sep. 16, 1997

[54] MOBILE WIRE DISPENSER

[76] Inventor: Blaine Sordahl, 6180 Sheridan Lake Rd., Rapid City, S. Dak. 57702

[21] Appl. No.: 283,629

[22] Filed: Aug. 1, 1994

[51] Int. Cl.⁶ .................. B65H 49/00; B65H 75/40
[52] U.S. Cl. .......................... 242/557; 242/403.1
[58] Field of Search .................. 242/557, 403.1, 242/391, 391.1, 129

[56] References Cited

U.S. PATENT DOCUMENTS

| | | | |
|---|---|---|---|
| 574,419 | 1/1897 | Hartzell | 242/403.1 |
| 2,155,769 | 4/1939 | Porter | 242/557 X |
| 2,664,253 | 12/1953 | Therrien | 242/557 |
| 2,823,873 | 2/1958 | Peterson | 242/403 X |
| 2,965,327 | 12/1960 | Blary | 242/403.1 X |
| 3,072,357 | 1/1963 | Sprague et al. | 242/403.1 X |
| 3,856,230 | 12/1974 | Zimmer . | |
| 3,937,414 | 2/1976 | Bank et al. . | |
| 3,990,653 | 11/1976 | Marcell . | |
| 4,137,939 | 2/1979 | Chow | 242/403.1 X |
| 4,208,021 | 6/1980 | Wall . | |
| 4,339,096 | 7/1982 | May . | |
| 4,391,422 | 7/1983 | McDonald | 242/557 X |
| 4,564,152 | 1/1986 | Herriage . | |
| 4,605,237 | 8/1986 | Torgrimson | 280/47.24 |
| 4,917,322 | 4/1990 | Combs . | |
| 4,946,113 | 8/1990 | Riffle et al. . | |

Primary Examiner—John M. Jillions
Attorney, Agent, or Firm—Gene R. Woodle

[57] ABSTRACT

A wire dispenser is disclosed upon which a typical spool of wire may be loaded and dispensed by a single person pulling the dispenser upon provided wheels. Wire may also be pulled from the dispenser with the dispenser stationary and wire may be loaded or unloaded with the spool resting on the ground.

6 Claims, 2 Drawing Sheets

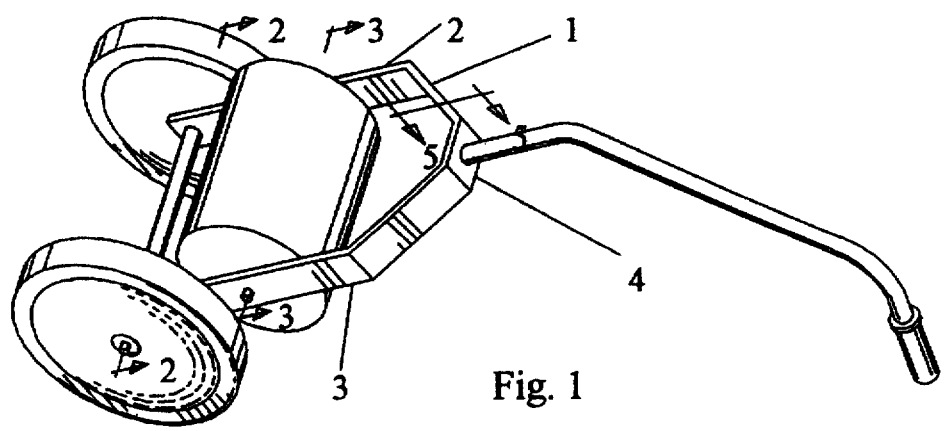
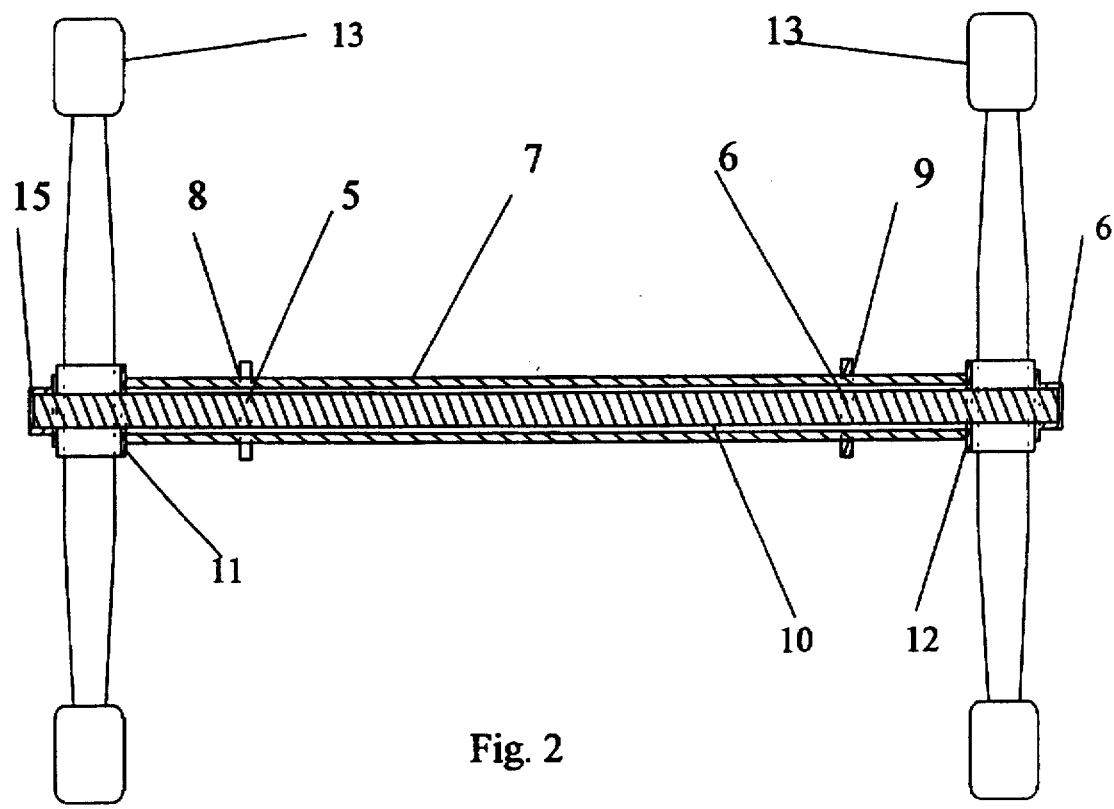

MOBILE WIRE DISPENSER

INTRODUCTION

This invention relates to a mobile dispenser for dispensing wire. Although the mobile wire dispenser is particularly suited for stringing barbed wire or other fencing material along a fence line in a farm, ranch, or construction setting, it is also suitable for laying wire in nearly any other situation. The instant invention has two wheels with a relatively wide wheel base which roll on an axle attached to the base of a "U" shaped frame. A spindle rotates about a detachable spindle axle parallel to the wheel axle and attached at about the midpoint of the frame. Spools of wire of commonly used sizes may he simply placed upon the spindle. A handle is attached to the forward end of the frame and bent downward so that when the end of the handle is held at a comfortable height the wire dispenser may he pulled along on the wheels and wire dispensed from the spool.

In a typical ranch setting, for example, barbed wire must often be strung on fence posts over rough terrain. Spools of barbed wire come in various sizes, but the size spool most commonly used for fencing of this type is approximately a foot long, a foot wide, and weighs about seventy-five pounds. One end of the wire is attached to a post and the spool is carried the desired distance until an appropriate length of wire has been unrolled along the fence line. The wire is then stretched tight and affixed to the fence posts along the fence line by staples or other appropriate means.

In some cases the spool is placed in the back of a pickup or other vehicle and the wire is strung by driving the vehicle along the fence line. This method is effective only in areas sufficiently flat and level to allow passage of the vehicle. In cases where the terrain is too rugged for vehicles, the spool of wire is often suspended on a rod and carried by two people, one holding either end of the rod. This method can be very clumsy, particularly in instances where the terrain is very rough, where the wire must be moved from one side of the fence line to the other or under an existing fence, or where the wire must be wound around two fence posts rather than merely strung between them.

One objective of the present invention is to provide a mobile wire dispenser for stringing wire over rough terrain which may be operated easily and efficiently by a single person; another objective of the present invention is to provide a means whereby the weight of the spool of wire is supported by the wheels and the ground rather than by the operator; another objective of the present invention is to provide a mobile wire dispenser which may be used either by pulling the apparatus along the fence line or by leaving the apparatus stationary and pulling wire from the spool; another objective of the present invention is to provide a mobile wire dispenser which may be pulled beneath an existing fence or maneuvered from one side of a fence line to the other; another objective of the present invention is to provide a mobile wire dispenser which carries the spool of wire at sufficient height to prevent weeds, grass, and the like from becoming entangled in the wire or the spool; another objective of the present invention is to provide a mobile wire dispenser onto which a spool of wire may be loaded without lifting the spool from the ground; another objective of the present invention is to provide a mobile wire dispenser with a sufficiently long wheel base to prevent tipping. These and other objects of the invention will be apparent to those skilled in this art from the following detailed description of a preferred embodiment of the invention.

BRIEF SUMMARY OF THE INVENTION

The instant invention is an mobile apparatus for dispensing wire. The instant invention has two wheels with a relatively wide wheel base which roll on an axle attached to the base of a "U" shaped frame. A spindle rotates about a detachable spindle axle parallel to the wheel axle and attached at about the midpoint of the frame. Spools of wire of commonly used sizes may be easily placed upon the spindle. A handle is attached to the forward end of the frame and bent downward so that when the end of the handle is held at a comfortable height the wire dispenser may be pulled along on the wheels and wire dispensed from the spool. The shape of the handle is such that when the mobile wire dispenser is being pulled most of the weight of the spool of wire is supported by the wheels and the ground rather than by the operator. The instant invention is also configured so that when the frame is inverted and the handle points upward a spool of wire may be loaded onto the spindle without lifting the spool.

BRIEF DESCRIPTION OF THE DRAWINGS

The invention is further described in connection with the accompanying drawings, in which:

FIG. 1 is a perspective view of a mobile wire dispenser constructed in accordance with the teachings of the present invention;

FIG. 2 is a cross-sectional view of the wire dispenser shown in FIG. 1 taken along lines 2—2;

DETAILED DESCRIPTION OF INVENTION

Figure 3:
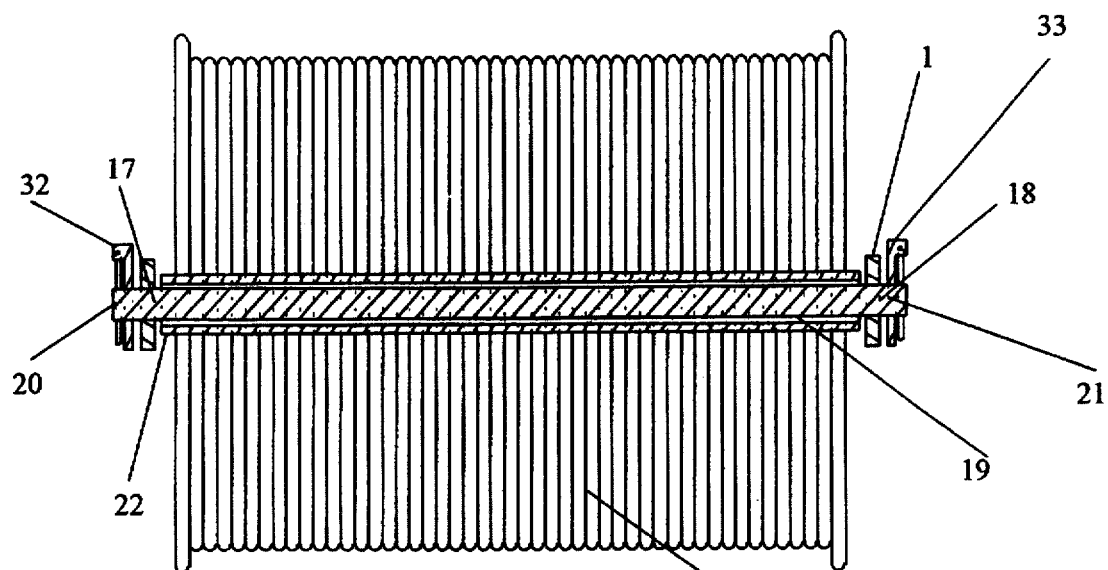
FIG. 3 is a cross-sectional view of the wire dispenser shown in FIG. 1 taken along lines 3—3.

The mobile wire dispenser is an apparatus for dispensing wire easily and efficiently over nearly any terrain. Spools of wire of typical size, shape, and weight may be loaded directly onto the mobile wire dispenser and the mobile wire dispenser may be operated by a single person. With reference to the drawings the preferred embodiment of the mobile wire dispenser is described in detail below.

The general configuration of the preferred embodiment of the mobile wire dispenser is shown in FIG. 1. It includes a frame 1 which has the general shape of a "U" with a forward end and a rearward end. At the rearward end of the frame 1 there is a leg 2 and a leg 3. At the forward end of the frame 1 is a handle plate 4. In the preferred embodiment the frame 1 is made of a flat iron strap bent into the appropriate shape, but other materials including steel, aluminum, and the like could be used. The frame 1 has a given length and width.

Referring now to the cross-sectional view in FIG. 2, there are two openings having a given diameter, opening 5 in the rearward end of leg 2 and opening 6 in the rearward end of leg 3. An axle housing 7 having a given length longer than the width of said frame 1 and a given diameter slightly less than the diameter of the openings 5 and 6 is provided. The axle housing 7 which is a hollow cylinder is placed through opening 5 and opening 6 so that the ends of the axle housing 7 protrude beyond the frame 1 by equal lengths. In the preferred embodiment the axle housing 7 is attached to the frame 1 by two welds, one at weld point 8 and one at weld point 9; but other methods of attachment including screw threading of the axle housing 7 and said frame 1 could be used. In the preferred embodiment the axle housing 7 is made from iron pipe, but other materials including steel pipe, copper tubing, or the like could be used. An axle 10 having a given diameter slightly less than the inside diameter of the axle housing 7 and a given length slightly longer than the length of the axle housing 7 is placed inside the axle housing 7 so that the ends of the axle 10 protrude beyond the axle housing 7 by equal lengths. Flat washers 11 and 12 having an opening slightly greater than the diameter of the axle 10 and slightly smaller than the outside diameter of the axle housing 7 are slipped over the ends of the axle 10 and rest against the ends of the axle housing 7. Two wheels 13 having a hub diameter slightly greater than the diameter of the axle 10 are slipped onto each end of the axle 10. In the preferred embodiment the wheels 13 are conventional wheels having resilient plastic rims and ball bearing hubs which rotate freely around the axle 10. Two conventional push nuts 15 and 16 are pressed onto the ends of the axle 10. The push nuts 15 and 16 prevent the wheels 13 from sliding off the axle 10 and hold them in position against the washers 11 and 12. In the preferred embodiment push nuts 15 and 16 are used to attach the wheels 13 to the axle 10, but other means including washers and cotter pins could be used. The preferred embodiment includes the axle housing 7. The instant invention could also be constructed without the axle housing and with the axle 10 riding directly on said frame 1. However, the instant invention did not operate as efficiently during experimentation without the axle housing.

Referring now to the cross-sectional view in FIG. 3, there are two openings having a given diameter, one at 17 and one at 18, in said frame 1 at about the midpoint of the two said legs 2 and 3. A spindle axle 19 having a given diameter slightly less than the diameter of the two openings 17 and 18 and a given length slightly longer than the given width of said frame 1 passes through the openings 17 and 18 with equal lengths of the spindle axle 19 protruding beyond the width of the frame 1. There are two openings, opening 20 and opening 21, through the spindle axle 19. The openings are near the ends of the spindle axle 19 and perpendicular to the length of the spindle axle 19. In the preferred embodiment the spindle axle 19 is made from iron pipe with a given inside diameter and a given outside diameter, but it could also be made from other materials including steel or PVC pipe. A spindle 22 which is a hollow cylinder having a given length slightly shorter than the width of the inside of said frame 1 and a given inside diameter slightly greater than the outside diameter of the spindle axle 19 is placed over the spindle axle 19 and inside of said frame 1. The spindle 22 rotates freely about the spindle axle 19 and is made from iron pipe in the preferred embodiment, but could also be made of steel, PVC pipe, or the like. Two conventional lynch pins, 32 and 33, pass through the openings 20 and 21 in the spindle axle 19 and hold the spindle axle 19 and the spindle 22 in place on said frame 1. Spool 29 is a conventional spool of wire which may be placed on the spindle 22 within said frame 1. The preferred embodiment includes said spindle 22, but the instant invention could also be operated without said spindle 22 by placing the spool 29 directly upon said spindle axle 19. However, the instant invention did not operate as well during experimentation without said spindle 22.

Figure 4:
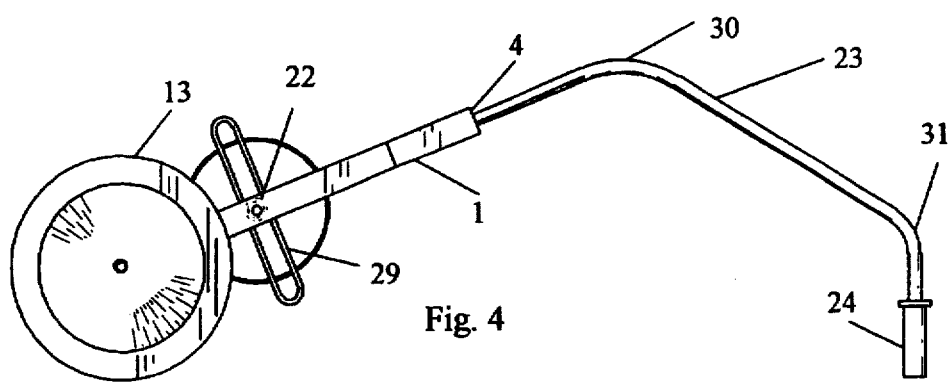
FIG. 4 is a side view of the wire dispenser shown in FIG. 1.

Referring now to FIG. 4, a cylindrical handle 23 having a given length and diameter is attached to said frame 1 at a handle plate 4. The handle 23 has a forward end and a rearward end and is attached to the frame 1 at its rearward end. There is a grip 24 placed upon the forward end of the handle 23. In the preferred embodiment the handle 23 is made from iron pipe, but steel pipe, aluminum tubing, or the like could also be used. In the preferred embodiment the grip is a hollow cylinder made of plastic and is a conventional element commonly referred to as a bicycle or handlebar grip.

Figure 5:
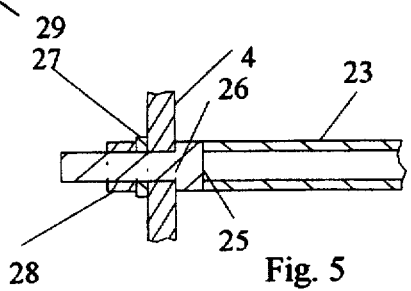
FIG. 5 is a partial cross-sectional view of the wire dispenser shown in FIG. 1 taken along lines 5—5.

Referring now to the partial cross-sectional view in FIG. 5, a bolt 25 having a given length and diameter is welded to the rearward end of said handle 23. There is an opening 26 in the middle of said handle plate 4. The opening 26 has a given diameter slightly greater than the diameter of the bolt 25. The bolt 25 passes through opening 26. A lock washer 27 is placed over the end of the bolt 25. A nut 28 is screwed onto the end of the bolt 25 affixing said handle 23 firmly to said frame 1. The foregoing details the attachment of said handle 23 to said frame 1 in the preferred embodiment, but other methods including a permanent weld could be used. The detachable handle is preferred for packaging and transportation.

Referring again to FIG. 4, a spool of wire of typical size, shape, and weight indicated by the spool 29 may be placed on said spindle 22 inside said frame 1. The spool 29 rotates freely about said spindle 22. The instant invention may be operated by attaching the end of the wire to a fixed starting point. The mobile wire dispenser is then pulled along the appropriate route, pulling wire from the spool 29, and leaving behind a length of wire. In the preferred embodiment said handle 23 is bent at bend point 30 near the rearward end of the handle and at bend point 31 near the forward end of said handle so that said grip 24 is below the plane of said frame 1. In the preferred embodiment when the bottom of said wheels 13 are level with the forward end of said handle 23, said frame 1 is inclined at an angle of approximately 22 degrees. In the preferred embodiment the present invention may also be operated by placing said wheels 13 and said grip 24 on the ground or, for example, in the back of a pick up and while holding the instant invention stationary pulling wire from the spool 29. The position of the instant invention with the bottom of said wheels 13 and said grip 24 level is referred to hereinafter as the "at rest" position.

Said spool 29 is loaded by placing said spool 29 on the ground or other working surface. Said spindle 22 is inserted through the longitudinal opening through the center of said spool 29. The frame 1 is inverted so that the forward end of said handle 23 is above the plane of said frame 1 with said spool 29 within said frame 1 and the spindle 22 aligned with said openings 17 and 18. Said spindle axle 19 is passed through said spindle 22 and said openings 17 and 18. Two lynch pins 32 and 33 are inserted through openings 20 and 21 at the ends of spindle axle 19 holding the spindle axle 19, the spindle 22, and the spool 29 in place between legs 2 and 3. Using this loading procedure eliminates the necessity of lifting wire spools which often weigh approximately seventy-five pounds when full during the loading process. Unloading of the spool 29 is accomplished by applying the above loading procedure in reverse order. The position of the instant invention with said frame 1 inverted and said grip 24 above the plane of said frame is referred to hereinafter as the "loading" position. The instant invention is operated by returning said grip 24 to its position below the plane of said frame 1, holding said grip 24 in one hand at a comfortable position, and pulling the instant invention along behind. This position is referred to hereinafter as the "operating" position.

Although in the preferred embodiment said frame 1 is inclined at approximately 22 degrees with the instant invention in the at rest position, said handle 23 may be bent so that said frame 1 is at a variety of angles provided that: in the at rest position the lowest point of said spool 29 is higher than the bottom of said wheels 13 and the lowest point of said grip 24; in the loading position with the lowest point of said spool 29 level with the bottom of said wheels 13, the lowest point of said handle 23 is higher than the bottom of said wheels 13; and in operating position said spindle axle 19 is forward of said axle 10.

In the preferred embodiment said frame 1 is approximately 22 inches long and 13 inches wide from inside surface to inside surface and the total length of said handle 23 is approximately 33 inches. These dimensions may be varied to, for example, accommodate longer spools of wire, provided the requirements of the preceding paragraph are met. In the preferred embodiment said axle housing 7 is approximately 19.5 inches long and said axle 10 is approximately 23.5 inches long. These dimensions may be varied provided said axle housing 7 is sufficiently long to provide a stable wheel base and provided said axle 10 is sufficiently long to accommodate said washers 11 and 12, said wheels 13, and said push nuts 15 and 16.

In the preferred embodiment said spool 29 is carried sufficiently high in operating position to reduce the possibility of grass, weeds, or the like becoming entangled in said spool 29 or the wire. In operating position the weight of said spool 29 is supported mostly by said wheels 13 rather than by the operator. Said handle 23 and said wheels 13 are configured so that the instant invention may be maneuvered over rough ground and under or around such obstacles as existing wires or fence posts. Said spool 29 is rested on the ground or other work surface during loading or unloading and does not have to be lifted which makes loading or unloading easy and efficient.

While the preferred embodiment of the invention has been shown and described, it will be apparent to those skilled in this art that various modifications may be made in this embodiment without departing from the spirit of the present invention. For that reason, the scope of the invention is set forth in the following claims:

I claim:

1. A mobile wire dispenser including:
   (1) A frame of given length and width having a forward end and a rearward end and having the shape of a "U" with the opening of the "U" at the rearward end of the frame, the frame having two openings at the rearward end with one of the openings through each leg of the "U;"
   (2) An axle having a length greater than the given width of said frame and a given diameter slightly less than said openings in said frame, the axle passing though the openings in said frame;
   (3) Two wheels placed over either end of said axle and outside of said frame, the wheels rotating freely about said axle;
   (4) Means for holding said wheels in place on said axle;
   (5) A spindle of a given length and diameter, having a cylindrical shape and a length slightly shorter than the width of said frame, the spindle having given length and diameter such that a spool of wire may be placed upon the spindle;
   (6) Fastening means for attaching said spindle to said frame parallel to said axle approximately halfway between the forward end and the rearward end of said frame, the means being capable of attaching said spindle and said spool of wire to said frame and of detaching said spindle and said spool of wire from said frame;
   (7) A handle of given length and diameter and having a forward end and a rearward end, the rearward end of the handle being attached to the forward end of said frame, the handle being shaped such that the forward end of the handle is below the plane of said frame and such that when the bottom of said wheels is level with the forward end of the handle the lowest point on said spool of wire is above the bottom of said wheels and said forward end of the handle, the handle further being shaped such that when said frame is inverted and the forward end of the handle is above the plane of said frame and when the bottom of said wheels is level with the lowest point of said spool of wire the lowest point of said handle is above the bottom of said wheels and the lowest point of said spool of wire;
   whereby a spool of wire may be placed upon the spindle and wire may be dispensed from the spool either by pulling on the handle and rolling the wire dispenser on the wheels or by placing the forward end of the handle on a surface and pulling wire off the spool and whereby the spool of wire may be loaded onto the spindle by inverting the frame and resting the spool of wire and the wheels on a surface.

2. A mobile wire dispenser as set forth in claim 1 in which the spindle is a hollow cylinder and the fastening means for attaching the spindle to said frame is a detachable cylindrical spindle axle passing through the inside of the spindle.

3. A mobile wire dispenser as set forth in claim 2 in which a hand grip is placed upon the forward end of the handle.

4. A mobile wire dispenser including:
   (1) A frame of given length and width having a forward end and a rearward end and having the shape of a "U" with the opening of the "U" at the rearward end of the frame, the frame having two openings at the rearward end with one of the openings through each leg of the "U;"
   (2) An axle housing in the shape of a hollow cylinder with a given length longer than the given width of said frame and an outside diameter slightly smaller than said openings in said frame, the axle housing passing through said holes in said frame;
   (3) Means for attaching said axle housing to said frame;
   (4) An axle having a length greater than the given length of said axle housing and a given diameter slightly smaller than the inside diameter of said axle housing, the axle passing though the inside of said axle housing;
   (5) Two wheels placed over either end of said axle and outside of said frame and said axle housing, the wheels rotating freely about said axle;
   (6) Means for holding said wheels in place on said axle;
   (7) A spindle of a given length and diameter, having a cylindrical shape and a length slightly shorter than the width of said frame, the spindle having length and diameter such that a spool of wire may be placed upon the spindle;
   (8) Fastening means for attaching said spindle to said frame parallel to said axle approximately halfway between the forward end and the rearward end of said frame, the means being capable of attaching said spindle and said spool of wire to said frame and of detaching said spindle and said spool of wire from said frame;
   (9) A handle of given length and diameter and having a forward end and a rearward end, the rearward end of the handle being attached to the forward end of said frame, the handle being shaped such that the forward end of the handle is below the plane of said frame and such that when the bottom of said wheels is level with the forward end of the handle the lowest point on said spool of wire is above the bottom of said wheels and said forward end of the handle, the handle further being shaped such that when said frame is inverted and the forward end of the handle is above the plane of said frame and when the bottom of said wheels is level with the lowest point of said spool of wire the lowest point of said handle is above the bottom of said wheels and the lowest point of said spool of wire;

whereby a spool of wire may be placed upon the spindle and wire may be dispensed from the spool either by pulling on the handle and rolling the wire dispenser on the wheels or by placing the forward end of the handle on a surface and pulling wire off the spool and whereby the spool of wire may be loaded onto the spindle by inverting the frame and resting the spool of wire and the wheels on a surface.

5. A mobile wire dispenser as set forth in claim 4 in which the spindle is a hollow cylinder and the fastening means for attaching the spindle to said frame is a detachable cylindrical spindle axle passing through the inside of the spindle.

6. A mobile wire dispenser as set forth in claim 5 in which a hand grip is placed upon the forward end of said handle.

* * * * *